(12) United States Patent
Hall (10) Patent No.: US 7,504,030 B2
(45) Date of Patent: Mar. 17, 2009

(54) ACID MINE WATER DEMINERALIZER

(76) Inventor: Richard Melvin Hall, 120 Spring Run Rd., Butler, PA (US) 16001

( * ) Notice: Subject to any disclaimer, the term of this patent is extended or adjusted under 35 U.S.C. 154(b) by 0 days.

(21) Appl. No.: 11/729,708

(22) Filed: Mar. 30, 2007

(65) Prior Publication Data

US 2008/0237108 A1    Oct. 2, 2008

(51) Int. Cl.
*B01D 35/00*    (2006.01)
*C02F 1/00*    (2006.01)

(52) U.S. Cl. ............... 210/205; 210/198.1; 210/170.04; 210/170.06; 261/115; 261/116

(58) Field of Classification Search ............... 210/760, 210/192, 170.04, 198.1, 628, 101, 170.06, 210/199, 256, 721, 722, 748, 205; 261/DIG. 75, 261/76, 78.2, 79.2, 108, 109, 116, 115
See application file for complete search history.

(56) References Cited

U.S. PATENT DOCUMENTS 4,474,477 A * 10/1984 Smith et al. ................. 261/118

* cited by examiner

*Primary Examiner*—Matthew O Savage
*Assistant Examiner*—Lucas Stelling (57) ABSTRACT

The acid mine water demineralization apparatus consists of two concentric cylinders that are divided into a total of four sections; a water chamber, a gas chamber, a reaction zone, and an aeration zone. The water chamber transports acid mine water to the inlets of a plurality of the sharp edged orifices. The gas chamber receives ozone from an external source and sends it through a porous plate into the reaction zone, thus ensuring the gas is dispersed uniformly throughout the reaction zone. Water passing through the sharp edged orifices into the reaction zone reacts with the ozone to oxidize the insoluble metals in the water. Exiting the reaction zone, the water enters into the aeration zone where additional oxygen is added to the water and the agitation of the water is calmed before it enters a settling tank.

5 Claims, 9 Drawing Sheets

1 DEMINERALIZER END PLATE WITH WATER INLET
2. OZONE INLET
5. AIR VENTS
6. TREATED WATER DISCHARGE
9. SCREENS
10. WATER CHAMBER
13. SHARP EDGED ORIFICE ASSEMBLY (TYP)
14. POROUS PLATE

GAS AND WATER FLOW PATTERNS

EXTERNAL VIEW ACID MINE
WATER DEMINERALIZER
FIG 1
AMMENDED

1. DEMINERALIZER END PLATE WITH WATER INLET
2. OZONE INLET
3. OUTER CONCENTRIC CYLINDER
4. INNER CONCENTRIC CYLINDER
5. AIR VENTS
6. TREATED WATER DISCHARGE
7. MOUNTING FRAME
8. MOUNTING BASE
9. SCREENS
10. WATER CHAMBER
11. ISOLATION PLATE
12. SPACER
13. SHARP EDGED ORIFICE ASSEMBLY (TYP)
14. POROUS PLATE

HORIZONTAL CROSS SECTION VIEW
WATER DEMINERALIZER
FIG 2
AMMENDED

1. DEMINERALIZER END PLATE WITH WATER INLET
2. OZONE INLET
5. AIR VENTS
6. TREATED WATER DISCHARGE
9. SCREENS
10. WATER CHAMBER
13. SHARP EDGED ORIFICE ASSEMBLY (TYP)
14. POROUS PLATE

GAS AND WATER FLOW PATTERNS
FIG 3
AMMENDED

4. INNER CONCENTRIC CYLINDER
5. AIR VENTS
13. SHARP EDGED ORIFICE
    ASSEMBLY (TYP)

EXTERNAL TOP VIEW

EXTERNAL SIDE VIEW
INNER CONCENTRIC CYLINDER
FIG 4
AMMENDED

2. OZONE INLET
3. OUTER CONCENTRIC CYLINDER
4. INNER CONCENTRIC CYLINDER
10. WATER CHAMBER
12. SPACER
14. POROUS PLATE

CROSS SECTIONAL VIEW
GAS CHAMBER
FIG 5
AMMENDED

3. OUTER CONCENTRIC CYLINDER
   HIGH DENSITY PLASTIC
4. INNER CONCENTRIC CYLINDER
   HIGH DENSITY PLASTIC
9. SCREEN, 304 SST
12. SPACER, HIGH DESITY PLASTIC
13. SHARP EDGED ORIFICE
    ASSEMBLY (TYP)
16. END SEAL

CROSS SECTIONAL VIEW
REACTION ZONE
FIG 6
AMMENDED

14. POROUS PLATE
15. PLATE HOLDER
    304 SST

POROUS PLATE ASSEMBLY
FIG 7
AMMENDED

9. SCREENS
   1/4" MESH
   304 SST
16. SCREEN HOLDER
    304 SST

SCREEN AND HOLDER
FIG 8
AMMENDED

1. PIPE, WATER INLET, 4", THREADED, 304 SST, WELDED TO 1/4" 304 SST 16" DIAMETER PLATE
18. SCREW, 10-32, STEEL (TYP)

1.PIPE, WATER INLET, 4", THREADED, SST. 4" L
2. 1/4" PLATE, SST, 16" DIA
3. BOLT, 10-32, SST (TYP)
NOTE: PIPE IS WELDED TO PLATE

FRONT VIEW
END PLATE
FIG 9
AMMENDED

SIDE VIEW 17. 1/4" PLATE, 304 SST, 16" DIA
18. SCREW, 10-32, STEEL (TYP)

FRONT VIEW

SIDE VIEW

ISOLATION PLATE
FIG 10
AMMENDED

MODIFIED ORIFICE ASSEMBLY
FIG 11
AMMENDED

ORIFICE PLATE
FIG 12
AMMENDED

MOUNTING OF FLOW ORIFICE
INTO THE INNER CYLINDER
FIG 13

AMMENDED

ACID MINE WATER DEMINERALIZER

BACKGROUND

During mineral extraction from the earth, metals such as iron, aluminum, and manganese are exposed to the atmosphere and moisture. As these metals become insoluble, hydrogen ions and acidity are produced. When the pH is lowered it enhances the dissolution of surrounding strata whereby more metals are leached into the ground waters. Metal concentrations are common in acid mine water; with the greatest concentrations being iron, aluminum, and manganese. The metals in their reduced state act as oxygen sinks and deplete from the water the dissolved oxygen that is necessary for a healthy aquatic ecosystem. It is not uncommon for acid mine water to contain less than 1 mg/l of dissolved oxygen.

Passive treatment is one method of treating the acid mine water. This requires the use of lagoons or engineered wetlands that depend on oxygen diffusion from the atmosphere; thus engineering criteria for wetland design often include minimal depth and a large surface area. Since only the top few inches of water can absorb oxygen, it takes a long time for soluble iron to be removed from the water. Large land masses at many mine discharge sites are not available, thereby making the removal of soluble metals from the water by passive treatment impossible. Finally, the passive treatment system cannot remove the last 10 mg/l of iron in the water, nor will it remove manganese. Most existing active treatment processes require less land but are labor intensive and have higher costs associated with them. In active treatment systems the biggest obstacles to overcome are the ability to adjust the water pH efficiently and to add oxygen to the water.

To adjust the pH, slaked lime is injected into the acid mine water until the pH is about 7.0. The slaking process requires expensive equipment and the maintenance of the equipment and associated pipes is labor intensive. Although lime treatment adjusts the pH easily only about 10 percent of the lime is consumed during the adjustment process and the remaining 90 percent becomes a waste disposal problem as it cannot be reused.

After the pH has been adjusted the water is pumped to an aeration tank where air is forced into the bottom of the tank and passed through a porous stone. This breaks the air into small bubbles. As the bubbles rise to the surface of the water, oxygen is absorbed by the acid mine water and the insoluble iron is oxidized. The water cannot become saturated with dissolved oxygen by this method. This type of treatment takes a relatively long time for the metals to precipitate.

This means the settling ponds, aerators, and clarifiers could be very large. The acid mine water demineralizer apparatus is small in size, 16 inches in diameter and 36 inches long and is designed to handle flow rates ranging from 500 to 2,000 gallons per minute per apparatus. Multiple demineralizers can be connected in parallel so that the amount of water to be processed could easily exceed 10,000 gpm.

The demineralizer saturates the oxygen depleted water with dissolved oxygen in milliseconds. Sharp edged orifices in the apparatus give the demineralizer the ability to oxidize metals by 4 orders of magnitude (or greater than literature obtained oxidation rates). The use of ozone has the added advantage of removing aluminum and manganese from the water at the same time the iron is being oxidized. Approximately 50 percent of the insoluble metals are oxidized within one second.

BRIEF SUMMARY OF THE ACID MINE WATER DEMINERALIZER

This invention addresses the need to treat acid mine water discharges, with flows that can exceed thousands of gallons per minute on less than one acre of land. The apparatus saturates the water with oxygen on contact. Approximately 50 percent of the insoluble metals in the water are oxidized in less than one second after entering the reaction zone. The apparatus greatly reduces the amount of alkaline material needed to adjust the pH of very acidic water and if the original pH is greater than 6.0, it may eliminate the need for an alkaline material all together. Because the apparatus uses ozone it will remove 98 percent of the manganese, 99 percent of the aluminum, 99 percent of the iron, and 100 percent of the $CO_2$ at the same time.

DETAILED DESCRIPTION OF THE ACID MINE WATER DEMINERALIZER

Figure 1:
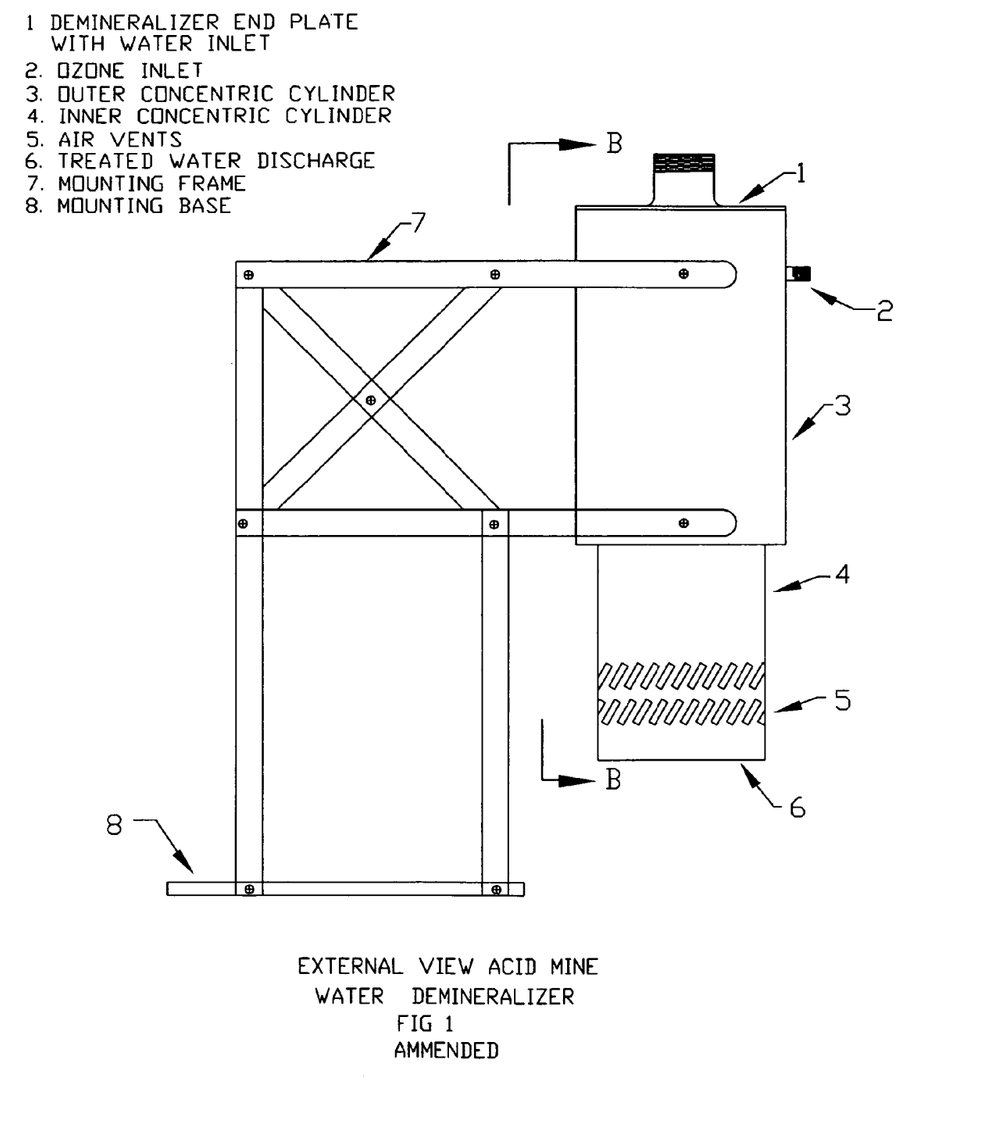
FIG. 1 External view of the acid mine water demineralizer with mounting bracket. The apparatus will be mounted in the vertical position as shown.
Figure 2:
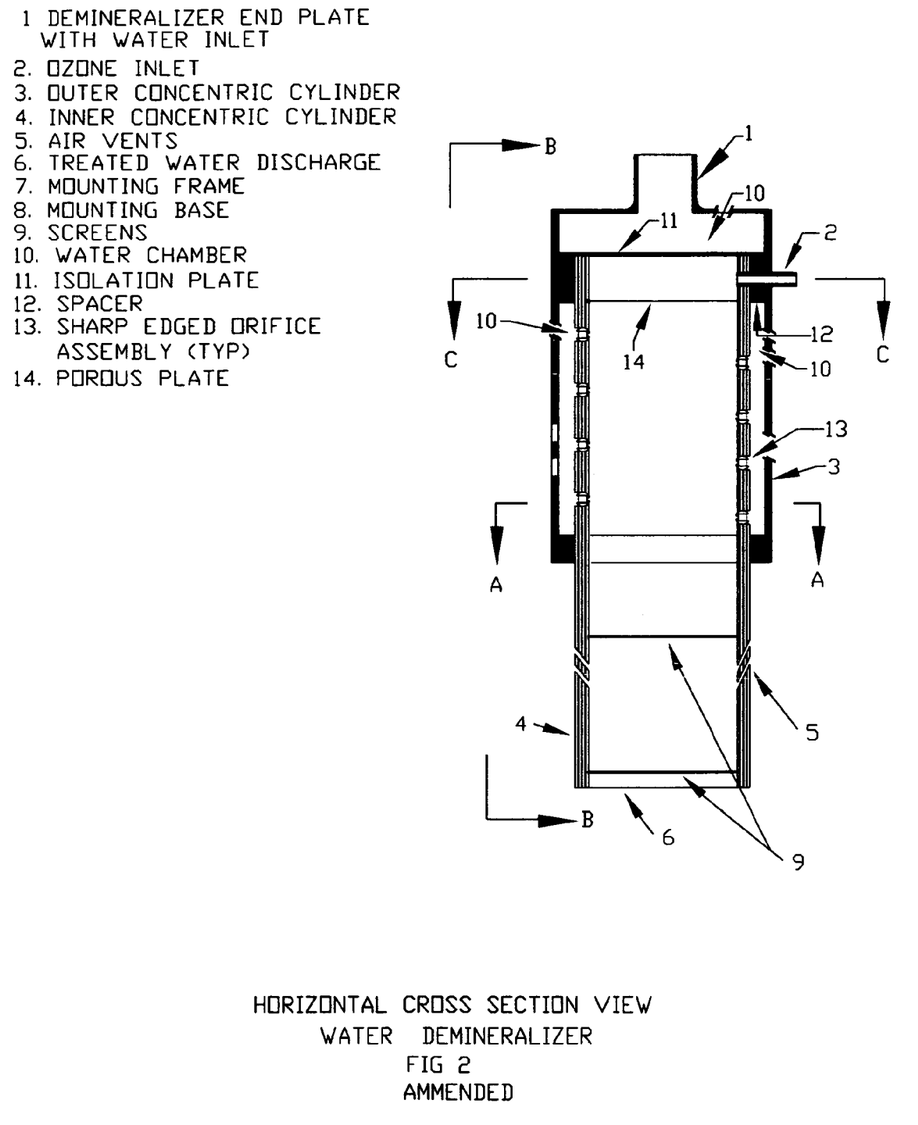
FIG. 2 Shows the cross section view of the acid mine water demineralizer, the various components, and their locations within the apparatus.
Figure 3:
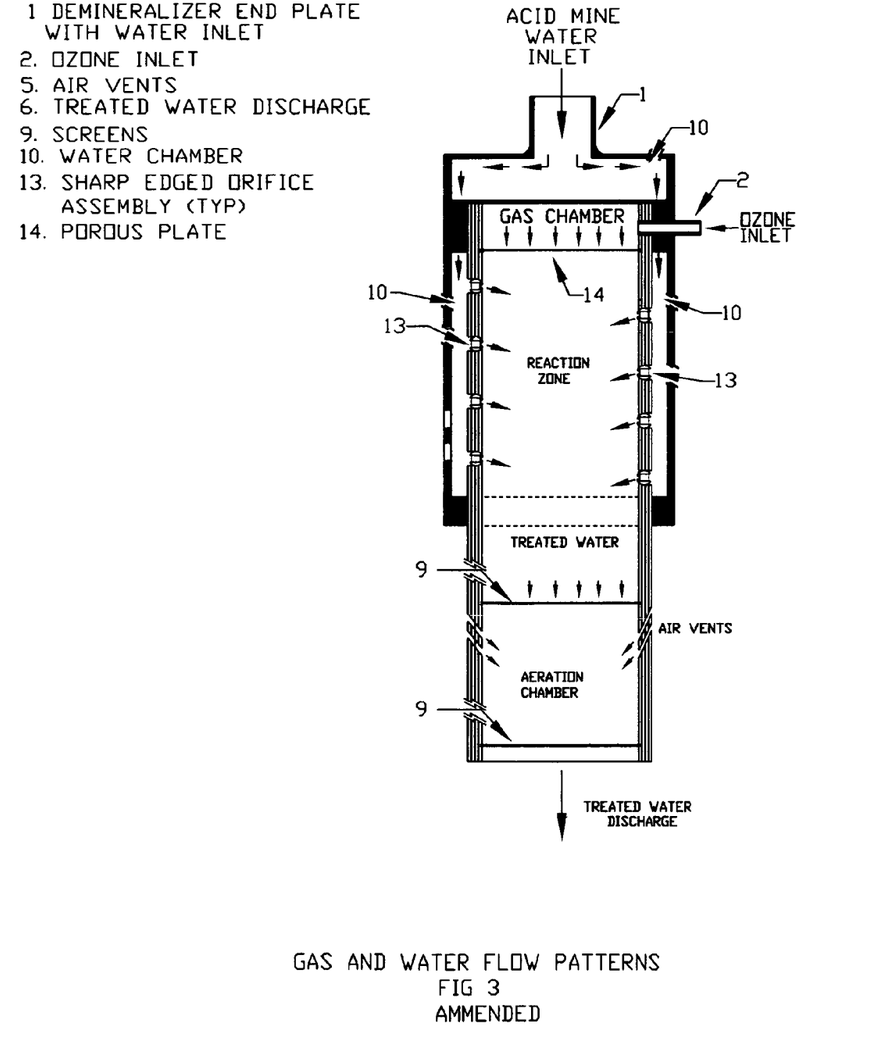
FIG. 3 Show a vertical cross sectional view of the acid mine water demineralizer apparatus depicting the following four sections; the water chamber, the gas chamber, the reaction zone, and the aeration zone. It also shows how the ozone and acid mine water are intended to flow through the apparatus FIG. 4 Shows the external view of the inner concentric cylinder showing the location of the orifices and the air vents. It also shows the horizontal cross section of the inner cylinder.
Figure 4:
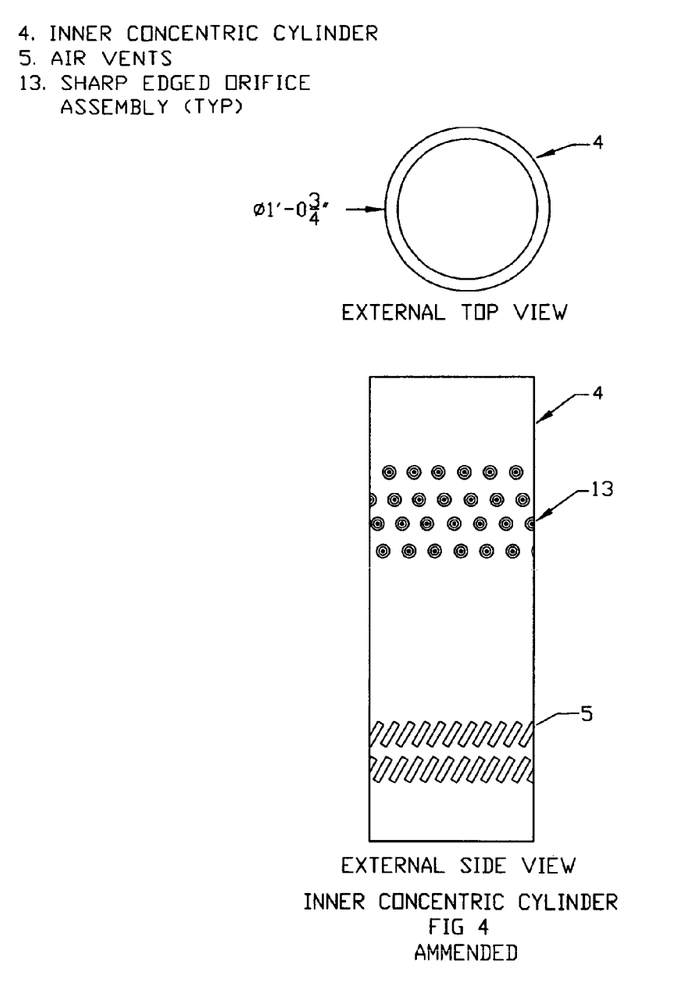

The acid mine water demineralization apparatus consists of two concentric cylinders 3 and 4 that are divided into a total of four sections; a water chamber, a gas chamber, a reaction zone, and an aeration zone.

The water chamber transports acid mine water to the inlets of a plurality of the sharp edged orifices 13 at 90 psig.

Figure 5:
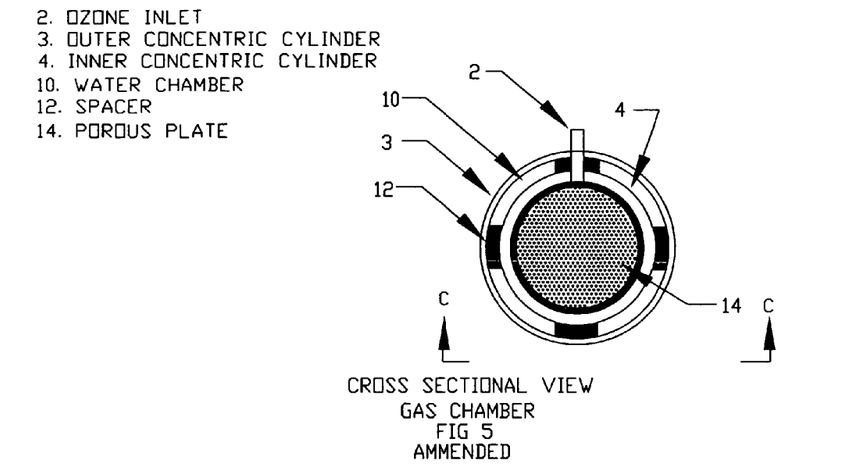
FIG. 5 Shows the cross section of the acid mine water demineralizer, the water channels, the spacers between the outer and inner cylinders, the inner concentric cylinder, the ozone inlet and the porous plate.
Figure 6:
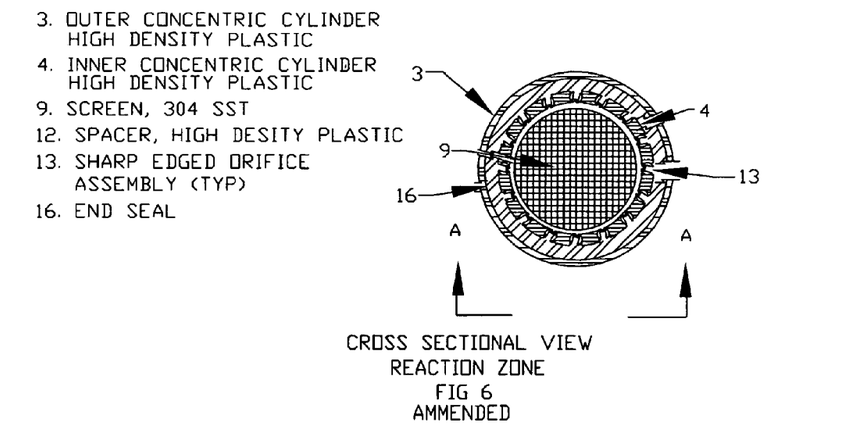
FIG. 6 Shows the cross sectional view of the acid mine water demineralizer. It shows the far end of the reaction zone including some of the sharp edged orifices, the spacer at the far end of the reaction zone, the outer cylinder, and the inner cylinder.
Figure 7:
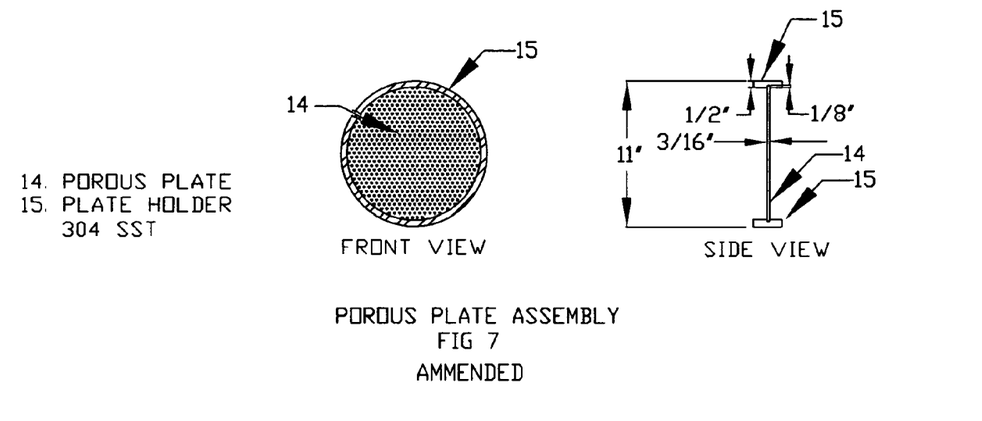
FIG. 7 Shows how the porous plate assembly is constructed.
Figure 8:
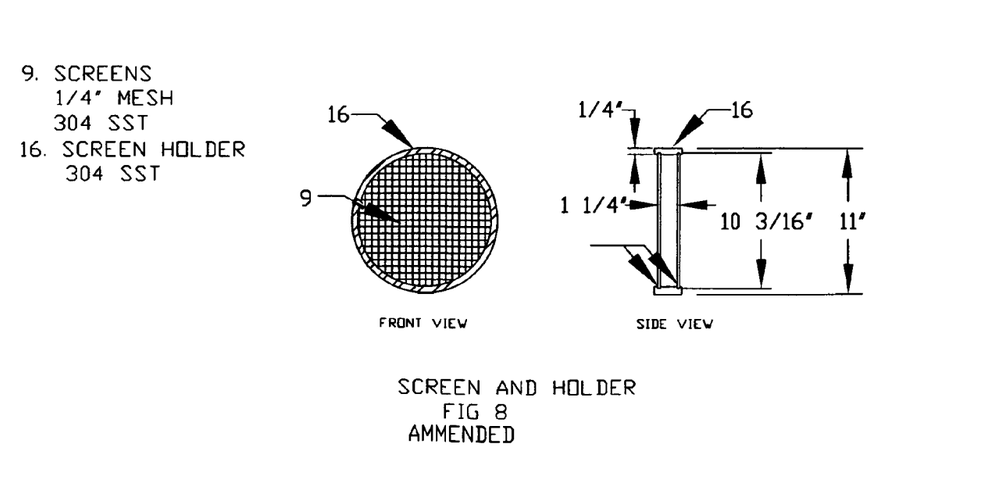
FIG. 8 Shows how the screens and their holder is constructed
Figure 9:
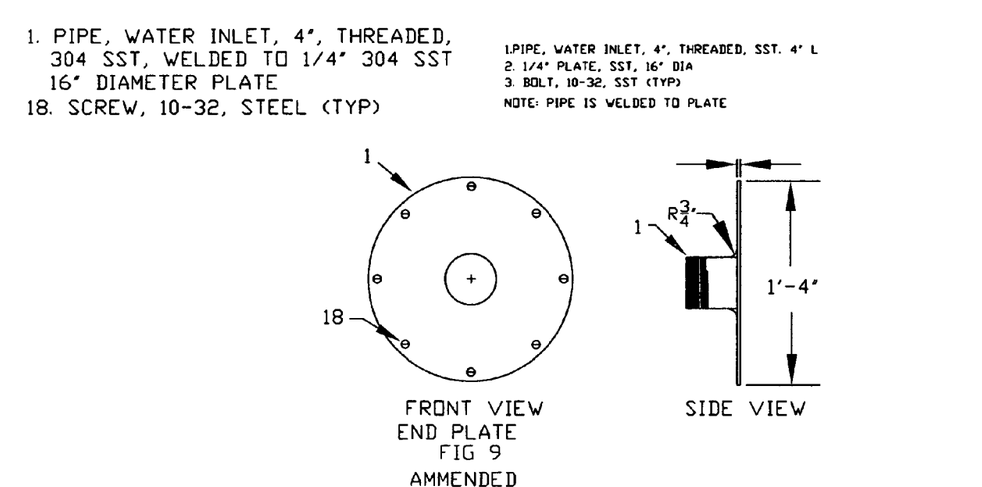
FIG. 9 Shows the back plate detail. It has the inlet water connection welded to it and in conjunction with the outer concentric cylinder forms part of the water chamber.
Figure 10:
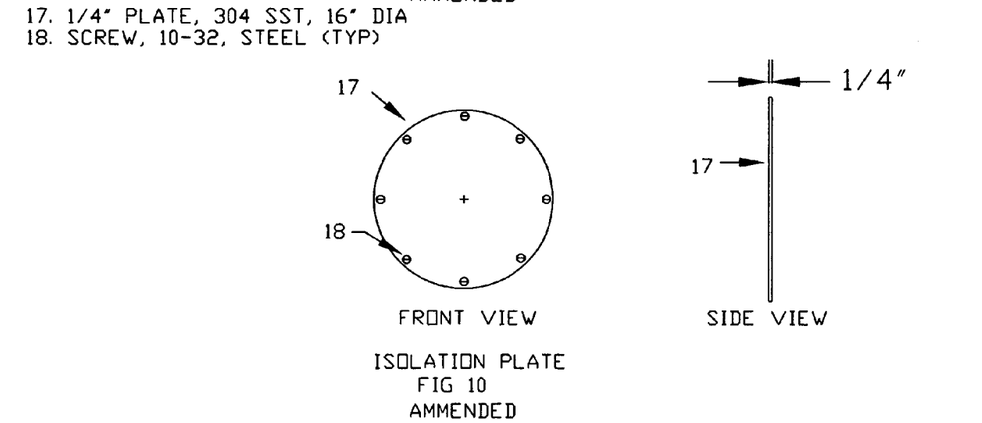
FIG. 10 Shows the isolation plate detail. This plate isolates the water chamber from the gas chamber.

The gas chamber receives ozone from an external source 2 and forces it through a porous plate 14 into the reaction zone. The effect of passing the gas through the porous plate 14 is to disperse the ozone throughout the reaction zone uniformly.

Figure 13:
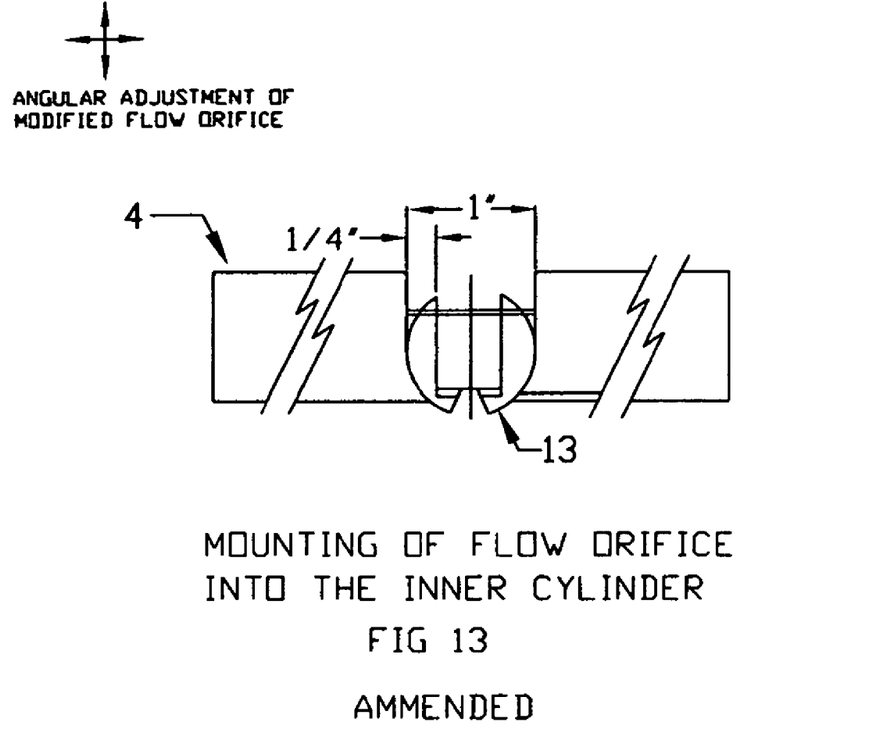
FIG. 13 Shows how the sharp edged orifice assembly is mounted in the wall of the inner concentric cylinder.

The sharp edged orifice 13 is set in a sphere which in turn is mounted into the wall of the inner concentric cylinder 4. This provides a path from the water chamber 10 to the reaction zone.

Figure 12:
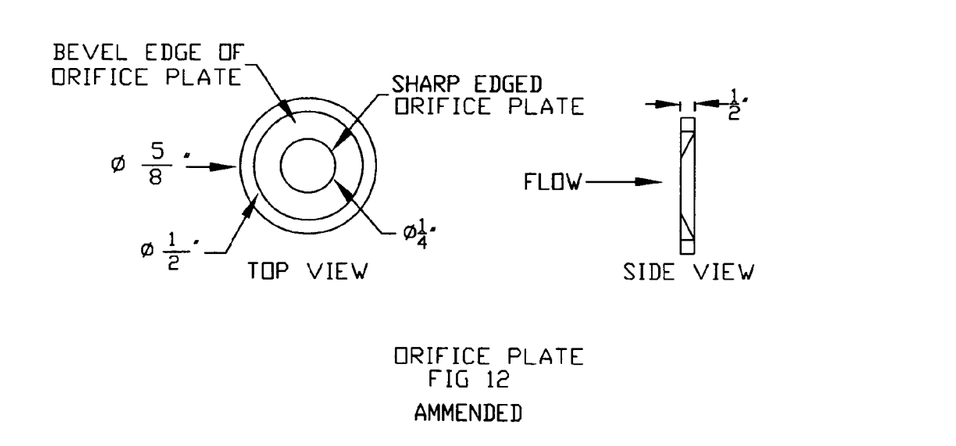
FIG. 12 Shows the details of the sharp edged orifice.

As the acid mine water is forced through the sharp edged orifice 13 the water detaches from the sides of the orifice 13 and forms a venta contracta (the point in the fluid stream where the fluid velocity is at its highest rate and the fluid pressure is at its lowest level). When the pressure drops below the vapor pressure of the liquid, cavitation occurs and vapor cavities will form within the bulk liquid. As the pressure recovers, the cavities collapse and localities of high temperature and pressure exist. This in turn enhances the chemical oxidation reactions.

Additionally, the generation of local high temperature and pressure induce the cleavage of water molecules which results in the formation of free radicals such as OH*. These free radicals have strong oxidizing capabilities that further oxidize ferrous iron.

Figure 11:
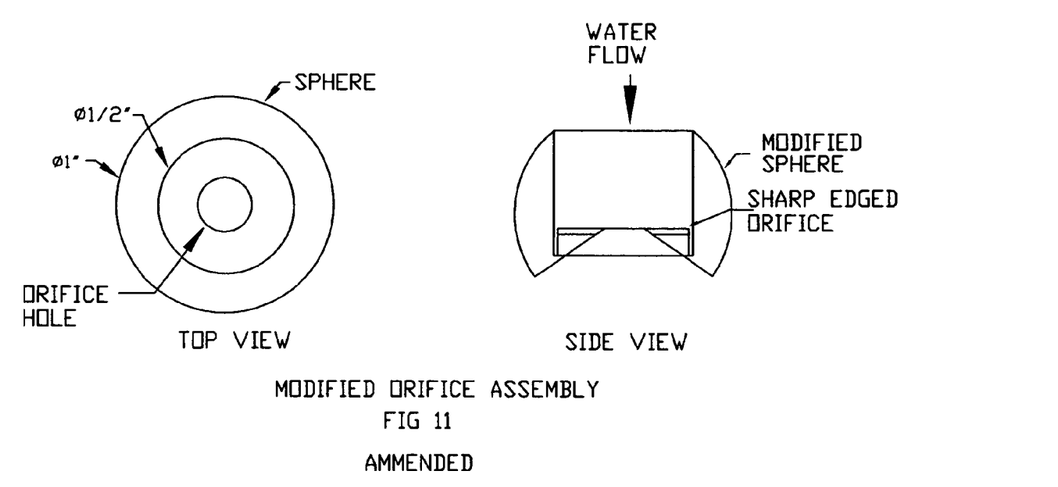
FIG. 11 Shows a modified orifice assembly. This assembly permits the direction of the flow to be adjusted to almost any angle.

The sphere is used to adjust the direction of the water flow so that the water will collide with other water streams from other orifices 13 causing the water to break into tiny droplets. The smaller the water droplets, the more surface area of the water that will come into contact with the ozone.

The majority of the ozone dissolved in the water will be depleted as the water leaves the reaction zone. Additional oxygen will be added to the water as it passes through the aeration zone.

The following are components of the apparatus:
1. Demineralizer end plate with water inlet
2. Ozone inlet
3. Outer concentric cylinder
4. Inner concentric cylinder
5. Air vents
6. Treated water discharge
7. Mounting frame
8. Mounting base
9. Screws
10. Water chamber
11. Isolation plate
12. Spacer
13. Sharp edged orifice plate
14. Porous plate
15. Plate holder
16. Screen holder
17. Plate
18. Screw

I claim:

1. An acid mine water demineralization apparatus, comprising:
    two concentric cylinders configured such that the outer concentric cylinder surrounds about one third of the length of the inner concentric cylinder and wherein the internal area of the cylinders is divided into four sections comprising a water chamber, a gas chamber, a reaction zone, and an aeration zone,
    wherein the outer concentric cylinder is adapted to transport acid mine water to inlets on the inner concentric cylinder such that the water chamber comprises the space between the outer concentric cylinder and the inner concentric cylinder,
    wherein the inner concentric cylinder, having a closed end and a second open end, comprising the gas chamber, the reaction zone, and the aeration zone, wherein the first end, covered by the outer concentric cylinder, comprises the gas chamber having a porous stone to evenly distribute ozone gas into the reaction zone,
    wherein the reaction zone is formed in the interior of the inner concentric cylinder between the gas chamber and the aeration zone, and the inlets on the inner concentric cylinder comprise a plurality of sharp edged orifices between the water chamber and the reaction zone configured to spray acid mine water into the reaction chamber in the form of tiny streams,
    wherein the aeration zone is formed in the interior of the inner concentric cylinder between the reaction zone and the second end, and is separated from the reaction zone by a screen configured to break water into tiny droplets, and the inner concentric cylinder further comprises air vents at the aeration zone.

2. The acid mine water demineralization apparatus of claim 1, wherein the angle of the plurality of the sharp edged orifices are adjustable.

3. The acid mine water demineralization apparatus of claim 1, wherein the porous plate is adapted to permit an even distribution of gas across the entire area of the reaction zone.

4. The acid mine water demineralization apparatus of claim 1, wherein the air vents are configured to permit oxygen to be dissolved into the water before the water is discharged from the apparatus.

5. The acid mine water demineralization apparatus of claim 1, wherein the screen is configured to break the water into small droplets and to reduce splashing as the water leaves the apparatus.

\* \* \* \* \*